United States Patent
O'Sullivan et al.

(10) Patent No.: US 8,370,368 B2
(45) Date of Patent: Feb. 5, 2013

(54) SYSTEM AND METHOD FOR PROVIDING USER-TAILORED VIEWS

(75) Inventors: Patrick Joseph O'Sullivan, Ballsbridge (IE); Susan S. Hanis, Raleigh, NC (US); Edith Helen Stem, Yorktown Heights, NY (US); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/940,624

(22) Filed: Nov. 15, 2007

(65) Prior Publication Data

US 2009/0132482 A1 May 21, 2009

(51) Int. Cl.
*G06F 7/00* (2006.01)
*G06F 17/30* (2006.01)
*G06F 13/14* (2006.01)

(52) U.S. Cl. .................. 707/754; 707/705; 707/736

(58) Field of Classification Search ........... 707/2–10, 707/101–102, 1, 999.001, 999.003, 999.101, 707/999.102, 999.104, 726, 765, 3, 103 R, 707/791, 705, 736, 754; 706/25–62; 725/46; 705/1.1, 7.35, 7.36, 7.38; 702/19; 709/222; 1/1

See application file for complete search history.

(56) References Cited

U.S. PATENT DOCUMENTS

| | | | |
|---|---|---|---|
| 7,051,012 B2 * | 5/2006 | Cole et al. | 705/3 |
| 7,233,937 B2 * | 6/2007 | Subramaniam et al. | 706/62 |
| 7,668,821 B1 * | 2/2010 | Donsbach et al. | 707/765 |
| 2003/0187664 A1 | 10/2003 | Bonebrake | |
| 2004/0181442 A1 * | 9/2004 | Hensel et al. | 705/7 |
| 2004/0199539 A1 * | 10/2004 | Richardson et al. | 707/102 |
| 2006/0031018 A1 * | 2/2006 | Bush et al. | 702/19 |
| 2007/0083894 A1 * | 4/2007 | Gonsalves et al. | 725/46 |

FOREIGN PATENT DOCUMENTS

| WO | 2006133050 | 12/2006 |
|---|---|---|
| WO | 2007016717 | 2/2007 |

OTHER PUBLICATIONS http://www.oreillynet.com/lpt/a/1721, "The Semantic Web: It's Whom You Know", pp. 1-4, dated Apr. 19, 2002, downloaded Mar. 27, 2012.

* cited by examiner

*Primary Examiner* — Cam Truong
*Assistant Examiner* — Cecile Vo
(74) *Attorney, Agent, or Firm* — Holland & Knight LLP; Brian J. Colandreo, Esq.; Michael T. Abramson, Esq.

(57) ABSTRACT

A method and computer program product include defining one or more filter criteria based upon, at least in part, an organizational structure. A body of content is filtered based upon, at least in part, the defined filter criteria. At least a portion of the filtered body of content is provided. The organizational structure may be defined within a corporate directory. The body of content may include one or more of a document library, a tag repository; a threaded discussion, a wiki, and a blog. Defining one or more filter criteria may include defining one or more filter criteria based upon, at least in part, an organizational hierarchy. Defining one or more filter criteria may further include defining one or more filter criteria based upon, at least in part, one or more positions defined within the organizational structure.

20 Claims, 11 Drawing Sheets

SYSTEM AND METHOD FOR PROVIDING USER-TAILORED VIEWS

TECHNICAL FIELD

This disclosure relates to systems and methods for searching and viewing content and, more particularly, to systems and methods for searching and filtering content to provide user-tailored views.

BACKGROUND

Social bookmarking, semantic tagging, and technologies around community centric collaboration are resulting in a tremendous amount of noise and data content. That is, a large volume of data is created through such community centric collaboration, however, the vast majority of the data is often irrelevant to any given user at any given time. As such, a user wishing to extract specific information from the large volume of data must sift through all the irrelevant data, the noise, in order to extract the specific information the user is looking for. In a community setting, such as a social network, such noise presents problems for a broad audience in terms of how much of the data is relevant, and in terms quickly getting to the content that is relevant to them. These problems are expanding in a proportional way to how the body of collaborative data conventionally expands. As the audience collaborating and adding to the content grows, the aspect of data relevance (or irrelevance to any given user at any given time) grows exponentially.

As one example of this problem, individuals who state that they are expert on arbitrary topics may believe they are in fact experts. However in some social circles, or from some viewpoints, the "expert's" input, comments, and additions may be seen as distracting, noise, irrelevant, or even junk. As an extension of this problem, the same metaphor applies to activity centric computing where activities and threads can be matured by a plurality of individuals that make up an unbounded, or even bounded, community. A great many of the activities or threads may be nothing but noise to any given user at any given time. Likewise, in a team room or document library there is a great deal of noise, in terms of information that is not relevant to a given user at a given time. The challenge is to reduce that noise to allow access to relevant information.

SUMMARY OF THE DISCLOSURE

According to a first implementation, a method includes defining one or more filter criteria based upon, at least in part, an organizational structure. A body of content is filtered based upon, at least in part, the defined filter criteria. At least a portion of the filtered body of content is provided.

One or more of the following features may be included. The organizational structure may be defined within a corporate directory. The body of content may include one or more of a document library, a tag repository; a threaded discussion, a wiki, and a blog.

Defining one or more filter criteria may include defining one or more filter criteria based upon, at least in part, an organizational hierarchy. Further, defining one or more filter criteria may include defining one or more filter criteria based upon, at least in part, one or more positions defined within the organizational structure. Additionally, defining one or more filter criteria may include defining one or more filter criteria based upon, at least in part, one or more relationships defined by the organizational structure.

Filtering the body of content based upon, at least in part, the defined filter criteria may include searching the body of content and selecting one or more pieces of content based upon, at least in part, the filter criteria. Filtering the body of content may include searching the body of content based upon, at least in part, the one or more filter criteria. Further, filtering the body of content may include searching the body of content and prioritizing one or more search results based upon, at least in part, the filter criteria. Additionally, filtering the body of content may include associating, based upon, at least in part, the one or more filter criteria, one or more indicators with one or more pieces of content within the body of content.

According to another implementation, a computer program product resides on a computer readable medium having a plurality of instructions stored thereon. When executed by a processor, the plurality of instructions cause the processor to perform operations including defining one or more filter criteria based upon, at least in part, an organizational structure. The instructions also cause the processor to filter a body of content based upon, at least in part, the defined filter criteria. At least a portion of the filtered body of content is provided.

One or more of the following features may be included. The organizational structure may be defined within a corporate directory. The body of content may include one or more of a document library, a tag repository; a threaded discussion, a wiki, and a blog.

The instructions for defining one or more filter criteria may include instructions for defining one or more filter criteria based upon, at least in part, an organizational hierarchy. Further, the instructions for defining one or more filter criteria may include instructions for defining one or more filter criteria based upon, at least in part, one or more positions defined within the organizational structure. Additionally, the instructions for defining one or more filter criteria may include instructions for defining one or more filter criteria based upon, at least in part, one or more relationships defined by the organizational structure.

The instructions for filtering the body of content based upon, at least in part, the defined filter criteria may include instructions for searching the body of content and selecting one or more pieces of content based upon, at least in part, the filter criteria. The instructions for filtering the body of content may include instructions for searching the body of content based upon, at least in part, the one or more filter criteria. Further, the instructions for filtering the body of content may include instructions for searching the body of content and prioritizing one or more search results based upon, at least in part, the filter criteria. Additionally, the instructions for filtering the body of content may include instructions for associating, based upon, at least in part, the one or more filter criteria, one or more indicators with one or more pieces of content within the body of content.

The details of one or more implementations are set forth in the accompanying drawings and the description below. Other features and advantages will become apparent from the description, the drawings, and the claims.

DETAILED DESCRIPTION

Figure 1:
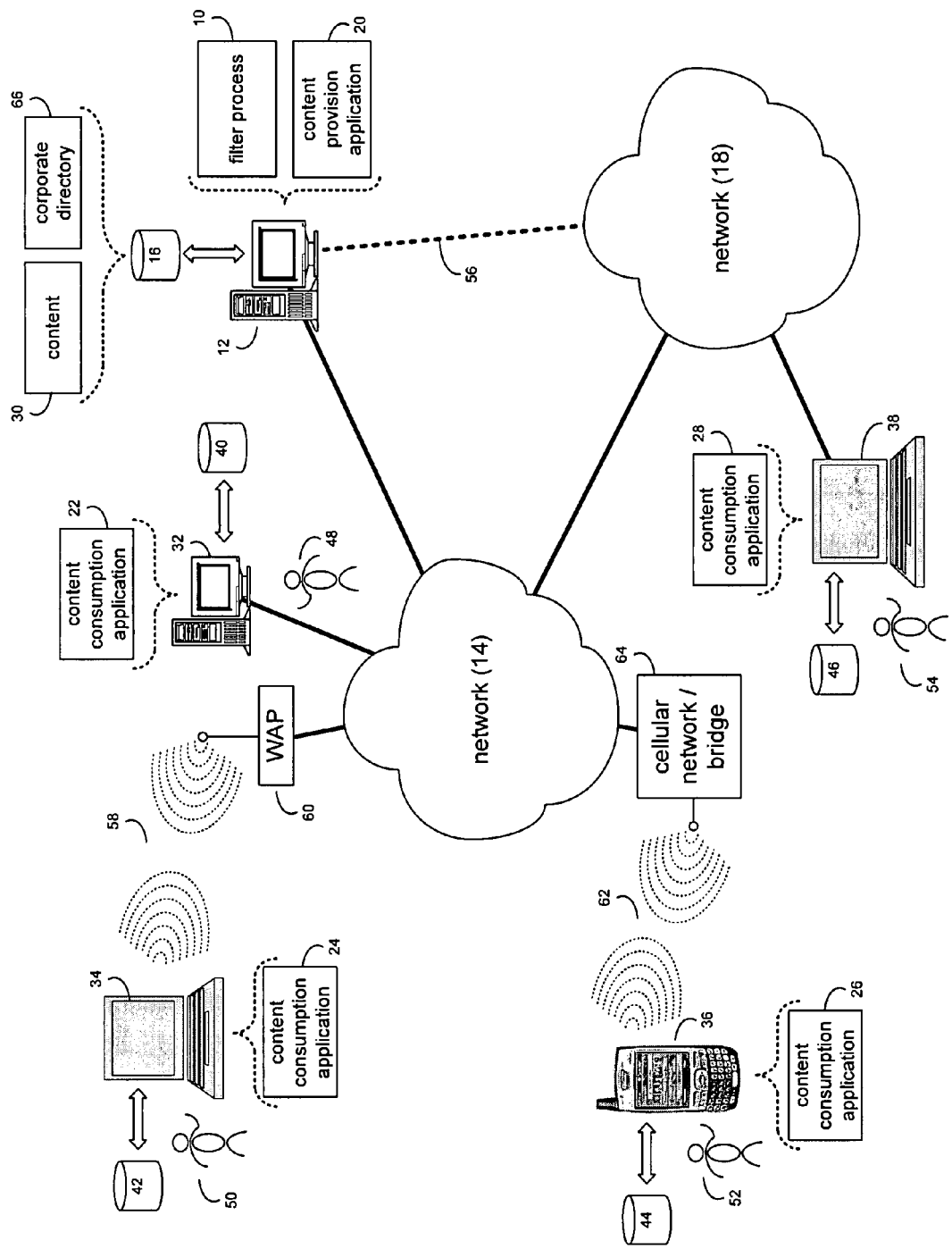
FIG. 1 diagrammatically depicts a filter process and a content application coupled to a distributed computing network.

Referring to FIG. 1, there is shown filter process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, the filter process may reside on a client electronic device, such as a personal computer, notebook computer, personal digital assistant, or the like.

As will be discussed below in greater detail, filter process 10 may allow a user to define one or more filter criteria based upon, at least in part, an organizational structure. A body of content may be filtered based upon, at least in part, the defined filter criteria. At least a portion of the filtered body of content is provided.

The instruction sets and subroutines of filter process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or content provision applications (e.g., content provision application 20), examples of which may include but are not limited to email server applications, a document library server application, a web server hosting one or more of a team space, a wiki, an a blog, a tagging system server application (e.g., allowing users to tag content on the internet, in a document library, in an email system, or other environment), or the like. Content provision application 20 may interact with one or more content consumption applications (e.g., content consumption applications 22, 24, 26, 28), examples of which may include, but are not limited to, email client application, document retrieval application (e.g., capable of requesting and/or retrieving documents from a document library), a web browser, a tagging system client application (e.g., capable of searching tags associated with content), or the like. Filter process 10 may be a stand alone application that interfaces with content provision application 20 and/or one or more of content consumption application 22, 24, 26, 28. Alternatively, filter process 10 may be an applet/application that is executed within content provision application 20.

The instruction sets and subroutines of relationship server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the filter process may be a client-side application (not shown) residing on one or more client electronic device 32, 34, 36, 38 (e.g., stored on storage device 40, 42, 44, 46, respectively). As such, the filter process may be a stand alone application that interfaces with a content consumption application (e.g., content consumption applications 22, 24, 26, 28) or a content provision application (e.g., content provision application 20), or may be an applet/application that is executed within a content consumption application. As such, the filter process may be a client-side process, a server-side application, or a hybrid client-side/server-side process, which may be executed, in whole or in part, by server computer 12, or one or more of client electronic device 32, 34, 36, 38. Client-side filter process and/or hybrid client-side/server-side filter process may be capable of taking advantage of Web 2.0 technologies. For example, Web Services, service oriented architecture implementations, AJAX, and the like may allow a client to communicate the relevant parameters to be utilized, e.g., for defining filter criteria. Such implementations may be advantageous, e.g., in the context of memory constrained devices.

The instruction sets and subroutines of content consumption applications 22, 24, 26, 28, which may be stored on storage devices 40, 42, 44, 46 (respectively) coupled to client electronic devices 32, 34, 36, 38 (respectively), may be executed by one or more processors (not shown) and one or more memory architectures (not shown) incorporated into client electronic devices 32, 34, 36, 38 (respectively). Storage devices 40, 42, 44, 46 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of client electronic devices 40, 42, 44, 46 may include, but are not limited to, personal computer 32, laptop computer 34, personal digital assistant 36, notebook computer 38, a data-enabled, cellular telephone (not shown), and a dedicated network device (not shown), for example. Using content consumption applications 22, 24, 26, 28, users 48, 50, 52, 54 may consume content (e.g., access tags within a tag repository, documents within a document library, emails including emails in a threaded discussion, content within a wiki, blogs, and the like). Consuming content may include accessing content provision application 20.

Users 48, 50, 52, 54 may access content provision application 20 directly through the device on which the content consumption application (e.g., content consumption applications 22, 24, 26, 28) is executed, namely client electronic devices 32, 34, 36, 38, for example. Users 48, 50, 52, 54 may access content provision application 20 directly through network 14 or through secondary network 18. Further, server computer 12 (i.e., the computer that executes content provision application 20) may be connected to network 14 through secondary network 18, as illustrated with phantom link line 56.

The various client electronic devices may be directly or indirectly coupled to network 14 (or network 18). For example, personal computer 32 is shown directly coupled to network 14 via a hardwired network connection. Further, notebook computer 34 is shown directly coupled to network 18 via a hardwired network connection. Laptop computer 38 is shown wirelessly coupled to network 14 via wireless communication channel 58 established between laptop computer 38 and wireless access point (i.e., WAP) 60, which is shown directly coupled to network 14. WAP 60 may be, for example, an IEEE 802.11a, 802.11b, 802.11g, Wi-Fi, and/or Bluetooth device that is capable of establishing wireless communication channel 58 between laptop computer 38 and WAP 60. Personal digital assistant 36 is shown wirelessly coupled to network 14 via wireless communication channel 62 established between personal digital assistant 36 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 32, 34, 36, 38 may each execute an operating system, examples of which may include but are not limited to Microsoft Windows™, Microsoft Windows CE™, Redhat Linux™, or a custom operating system.

Filter Process

Figure 2:
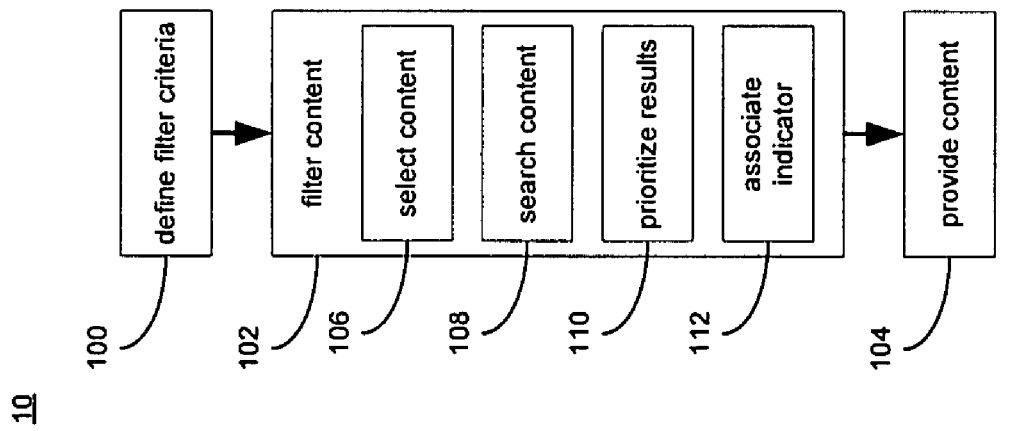
FIG. 2 is a flowchart of a process executed by the filter process of FIG. 1.

Referring also to FIG. 2, filter process 10 may define 100 one or more filter criteria based upon, at least in part, an organizational structure. Additionally, filter process 10 may filter 102 a body of content based upon, at least in part, the defined 100 filter criteria. Further, filter process 10 may provide 104 at least a portion of the filtered body of content.

As mentioned above, the body of content may include any body of data, including, but not limited to, for example, one or more of a document library, a tag repository; one or more emails (e.g., including one or more emails having a threaded discussion), a wiki, and a blog. For example, the body of content (e.g., content 30, residing on server computer 12), may include a tag repository, including a plurality of tags that users may have created associated with, for example web content, documents in a document library, documents in a team space, and the like. For example, a user may search the tag repository for tags relevant to Web 2.0, e.g., to pieces of content (e.g., web pages, documents in a document library, and so forth) other users have identified as being relevant to Web 2.0 topics. While content 30 is shown residing on server computer 12, it should be understood that the body of content may reside on one or more servers, computing devices, and/or storage devices coupled to one or more of networks 14, 18.

The organizational structure, upon which, at least in part, the one or more filter criteria may be based, may be for example, the organizational structure of a corporation, an agency, or the like. The organizational structure may be defined, for example, within a corporate directory. The corporate directory (e.g., corporate directory 66) may reside on a computing device (e.g., server computer 12) accessible by filter process 10. While corporate directory 66 is shown residing on server computer 12, it should be understood that the corporate directory may reside on any computing and/or storage device accessible by filter process 10, e.g., via network 14, 18. Corporate directory 66 may include, for example, a listing of at least a portion of the members of the corporation, as well as a hierarchal ranking, department, and position (e.g., in terms of title, job description, responsibilities, etc.). Similarly, corporate directory 66 may include, either directly or indirectly, associations between members of the corporation. For example, it may be discernable from corporate directory that a number of members of the organization are members of the same team, e.g., based upon, at least in part, the members being associated with a common department, or the like. In a similar manner, a members direct supervisor may be discernable based upon, at least in part, inclusion within the same department as the member, but having a higher hierarchal position within the organizational structure.

Figure 3:
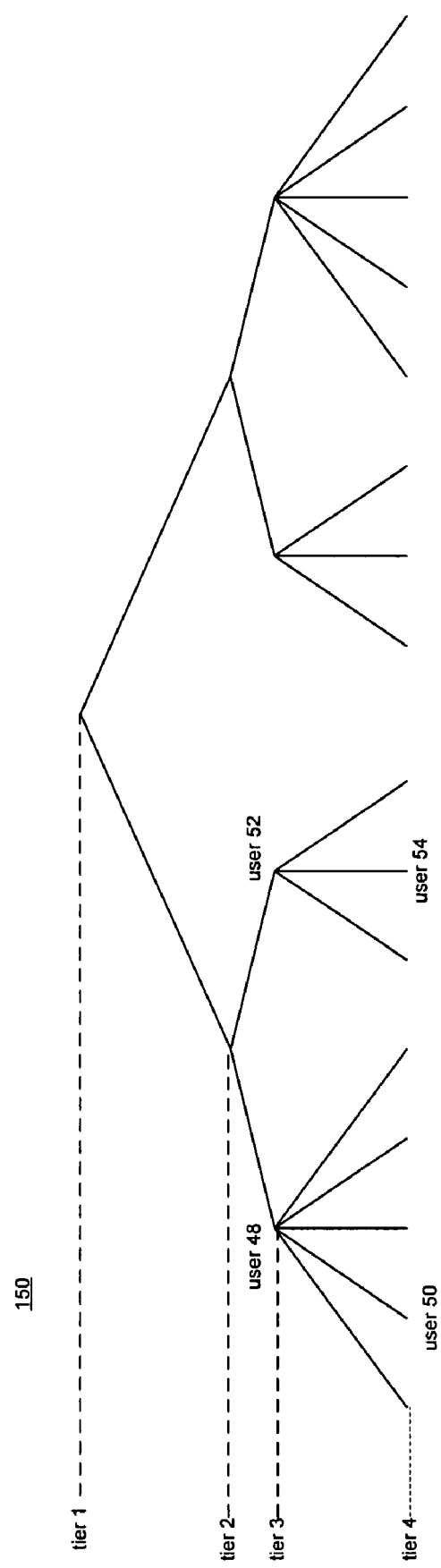
FIG. 3 is a diagrammatic view of an organizational structure.

For example, and referring also to FIG. 3, corporate structure 150 is diagrammatically depicted. Users 48, 50 may reside in the same department, however, user 48 may have a higher hierarchal position (e.g., may be senior) relative to user 50. As such user 48 may be discerned as being user 50's manager and/or having seniority relative to user 50. In addition to being discernable based on department and hierarchal position, corporate directory 66 may explicitly indicate that user 48 is user 50's manager. In a similar manner, corporate directory 66 may explicitly indicate those individuals subordinate to user 48 (e.g., the members of the department of which user 48 is a manager), including user 50. As also shown, users 50 and 54 may have equal hierarchal positions, but may reside in different departments. As mentioned above, corporate directory 66 may associate a position (e.g., in terms of title, job description, responsibilities, etc.) with one or more members of the organization.

Figure 4:
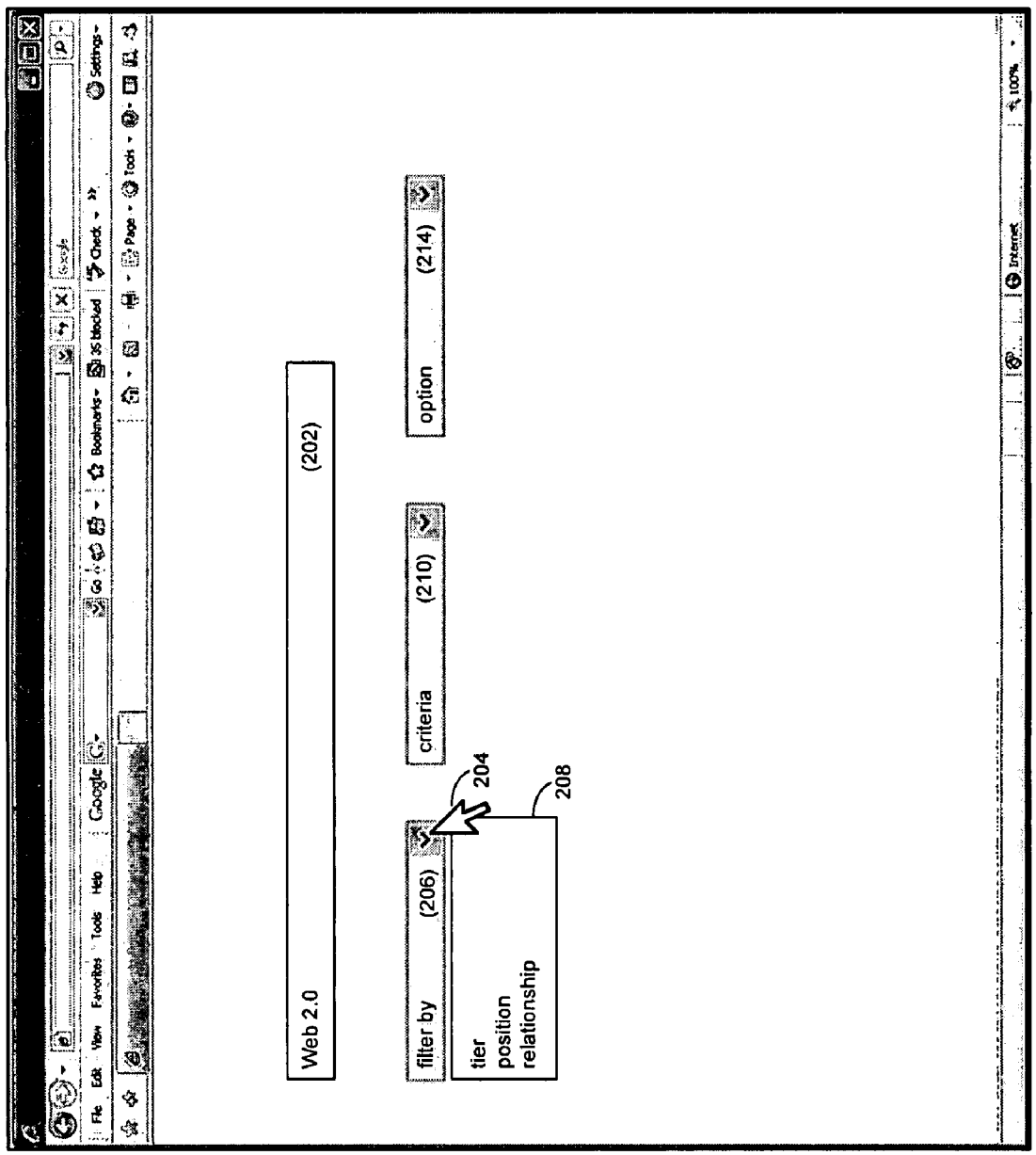
FIG. 4 is a diagrammatic view of a user interface screen provided by the filter process and/or the content application of FIG. 1.

Filter process 10 may allow a user to define 100 one or more filter criteria, which may include defining one or more filter criteria based upon, at least in part, an organizational hierarchy. For example, user 48 may be interested in information regarding Web 2.0. As such, user 48 may search content 30, which may include a tag repository including various tags added, edited, etc. by, e.g., members of the organization. Referring also to FIG. 4, filter process 10, content provision application 20, and/or content consumption application 22 may render user interface screen 200, including search field 202. User 48 may input, e.g., using an input device such as a keyboard (not shown), search topic (e.g., Web 2.0) in search field 202.

However, user 48 may not be interested in any content related to Web 2.0, but rather only content identified as related to Web. 2.0 by users having a hierarchal position of "tier 3" or below. Filter process 10 may allow user 48 to define a filter criteria based upon a hierarchal position of "tier 3" or below. For example, user 48 may select, via onscreen pointer 204 controlled by a pointing device (e.g., a mouse; not shown) filter by drop down 206. Selecting filter by drop down 206 may result in filter process 10, content provision application 20, and/or content consumption application 22 rendering filter menu 208, including filter options "tier", "position" and "relationship". While filter menu 208 is only shown including three filter options, this is for illustrative purposes only. Filter menu 208 may include any number of options according to design decision. Continuing with the above-stated example, in which user 48 is interested in tags created, added, or edited by users having a hierarchal position of "tier 3" or below, user 48 may select, via onscreen pointer 204, filter option "tier" in filter menu 208.

Figure 5:
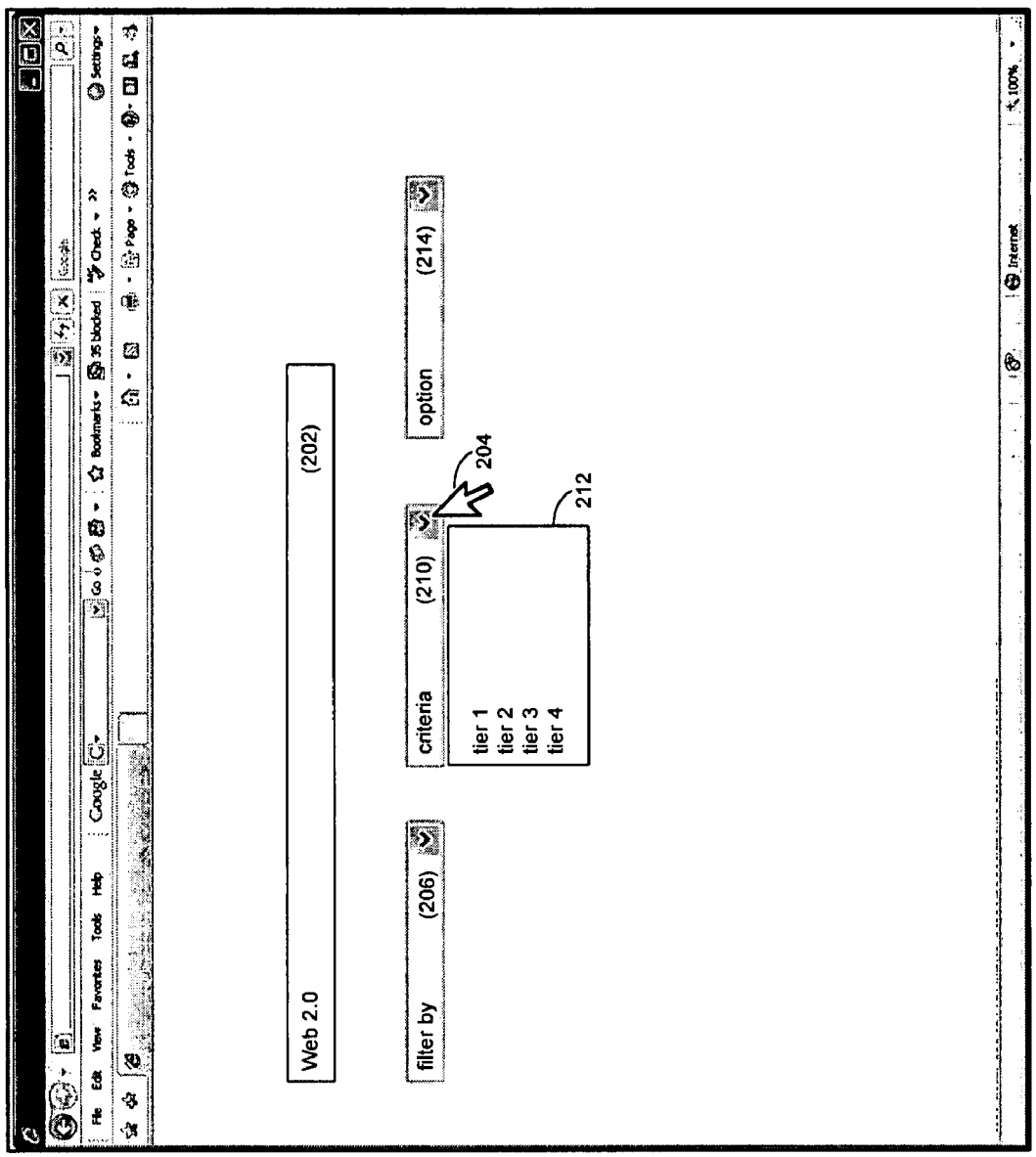
FIG. 5 is a diagrammatic view of a user interface screen provided by the filter process and/or the content application of FIG. 1.

Upon selecting filter option "tier", filter process 10 may activate criteria drop down 210. Referring also to FIG. 5, user 48 may select, via onscreen pointer 204, criteria drop down 210, resulting in filter process, content provision application 20, and/or content consumption application 22 rendering tier menu 212, including tier options "tier 1", "tier 2", "tier 3", "tier 4". While tier menu 212 is shown only including four options, this is for illustrative purposed only. A greater or lesser number of options may be included in tier menu 212 based on design decision. Continuing with the above-stated example, user 48 may select, via onscreen pointer 204, "tier 3" from tier menu 212.

Figure 6:
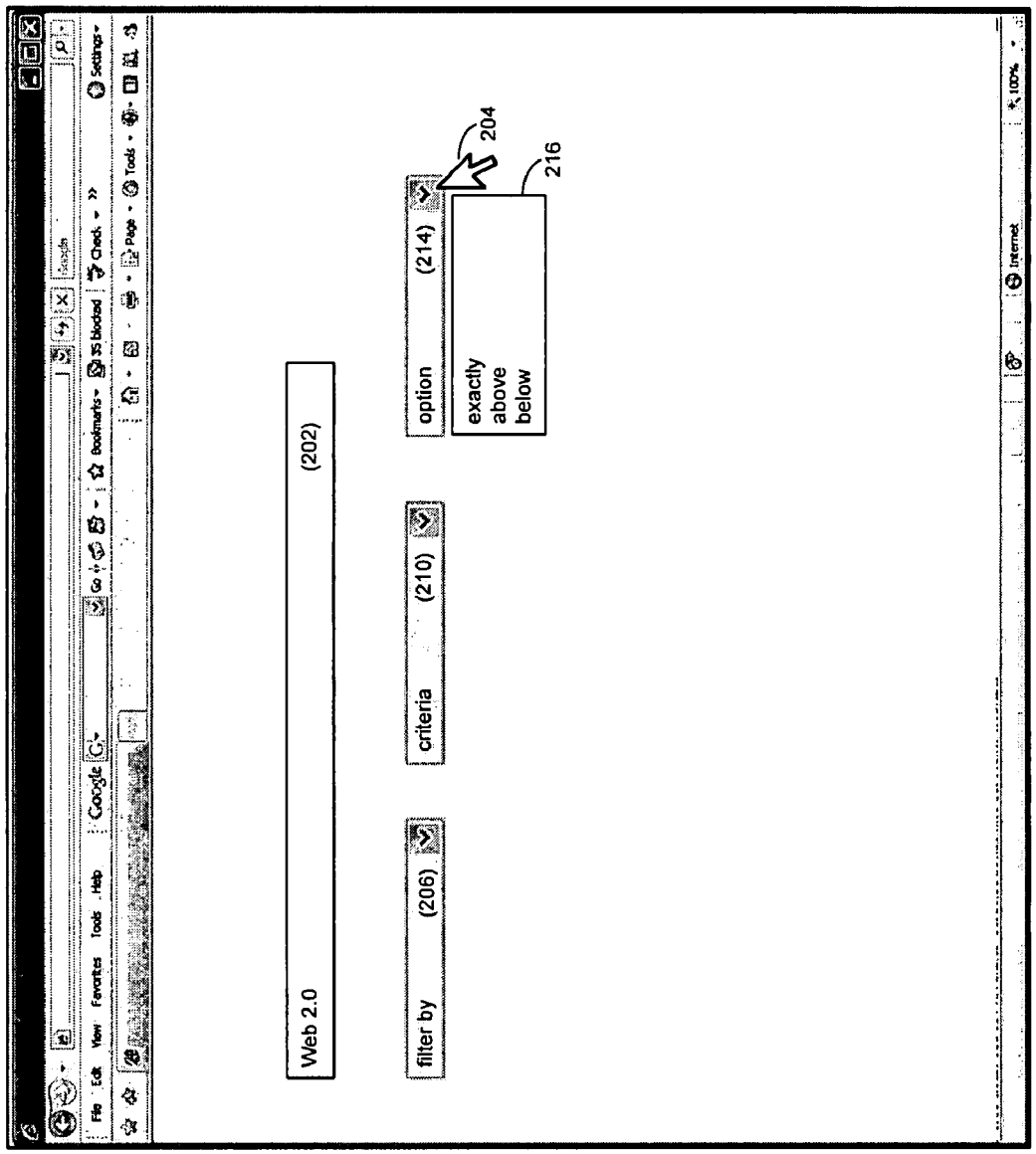
FIG. 6 is a diagrammatic view of a user interface screen provided by the filter process and/or the content application of FIG. 1.

Additionally, filter process 10 may allow user 48 to provide additional criteria using option drop down 214. For example, and referring also to FIG. 6, user 48 may select, via onscreen pointer 204, option drop down 214, resulting in filter process 10, content provision application 20, and/or content consumption application 22 rendering option menu 216. Consistent with the above-stated example, option menu 216 may include three options, namely "exactly", "above", and "below". User 48 may select, via onscreen pointer 204, "below" option from option menu 216, consistent with the desire to filter content 30 based upon, at least in part, documents created or added by users having a hierarchal position of tier 3 or below. Consistent with the foregoing description, filter process 10 may allow user 48 to define 100 a filter criteria based upon, at least in part, organizational hierarchy, e.g., a filter criteria of tier 3 or below. While not shown, further criteria may be provided, e.g., even to the point of specifying an individual user as the search criteria.

Figure 7:
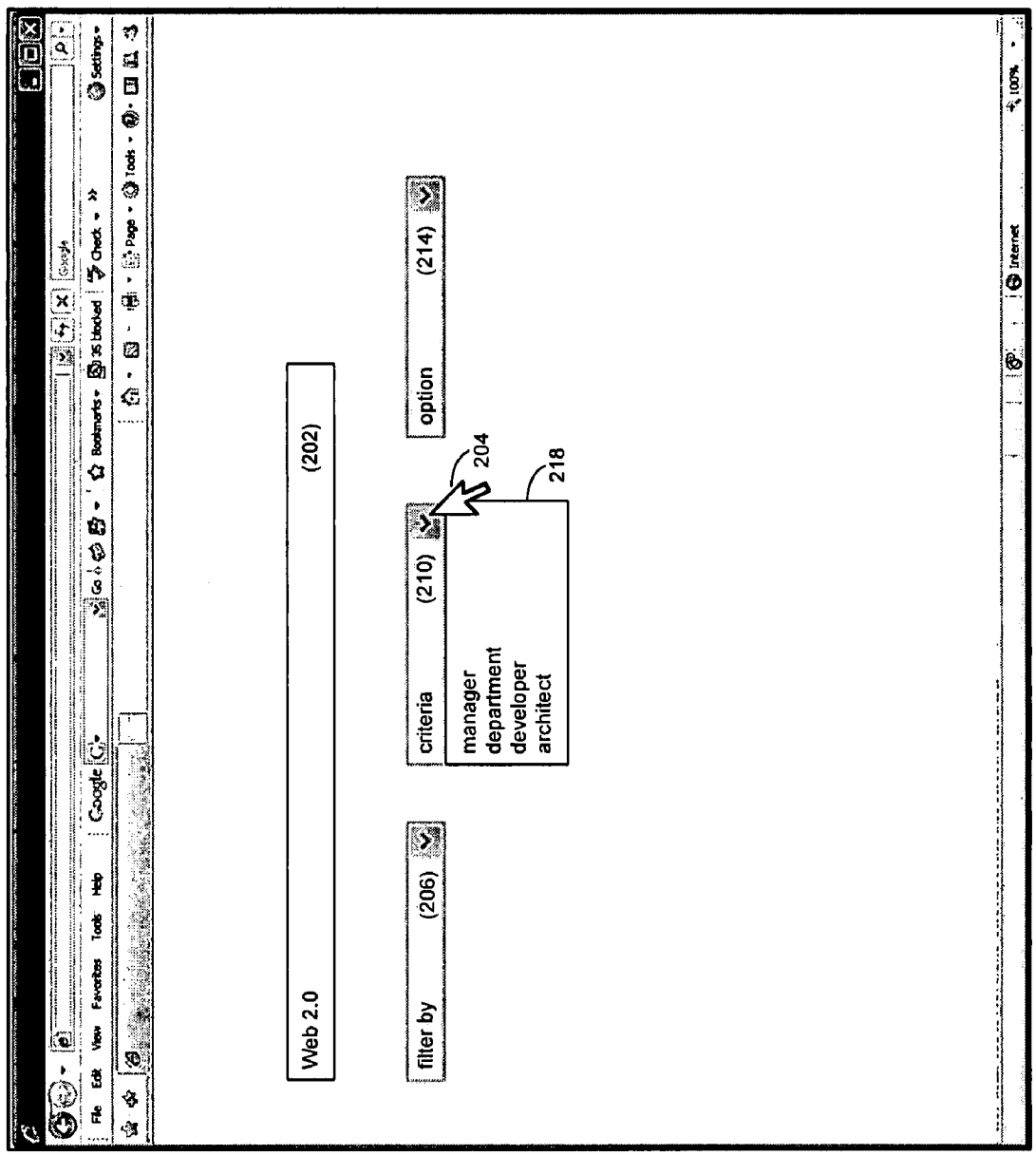
FIG. 7 is a diagrammatic view of a user interface screen provided by the filter process and/or the content application of FIG. 1.

Additionally/alternatively, defining 100 one or more filter criteria may include defining one or more filter criteria based upon, at least in part, one or more positions defined within the organizational structure. For example, to define 100 a filter criteria based upon, at least in part, one or more positions defined within the organizational structure, filter process 10 may allow user 48 to select, via onscreen pointer 204, "position" in filter menu 208 (e.g., as shown in FIG. 4). Selecting "position" in filter menu 208 may result in filter process activating criteria drop down 210. Referring also to FIG. 7, selecting criteria drop down 210 may result in filter process 10, content provision application 20, and/or content consumption application 22 rending position menu 218, including options, for example, "manager", "department", "developer", and "architect". It should be understood that position menu 218 may include various additional and/or alternative options. Positions options may relate to, for example, a title, job description, department, or other position that may be defined in corporate directory 66.

User 48 may select, via onscreen pointer 204, one or more position options from position menu 218. Continuing with this example, user 48 may be interested in content relating to Web 2.0 that was added or created by managers or architects. Accordingly, user 48 may select, via onscreen pointer 204, "manager" in position menu 218. As mentioned, filter process 10 may allow user 48 to select more than one position option. Continuing with this example, user 48 may additionally select, via onscreen pointer 204, "architect" in position menu 218. As such, filter process 10 may allow user 48 to define 100 filter criteria based upon, at least in part, positions "manager" and "architect". Based upon, at least in part, corporate directory 66, individuals within the company having a position of "manager" or "architect" may be identified for the purpose of filtering content.

Figure 8:
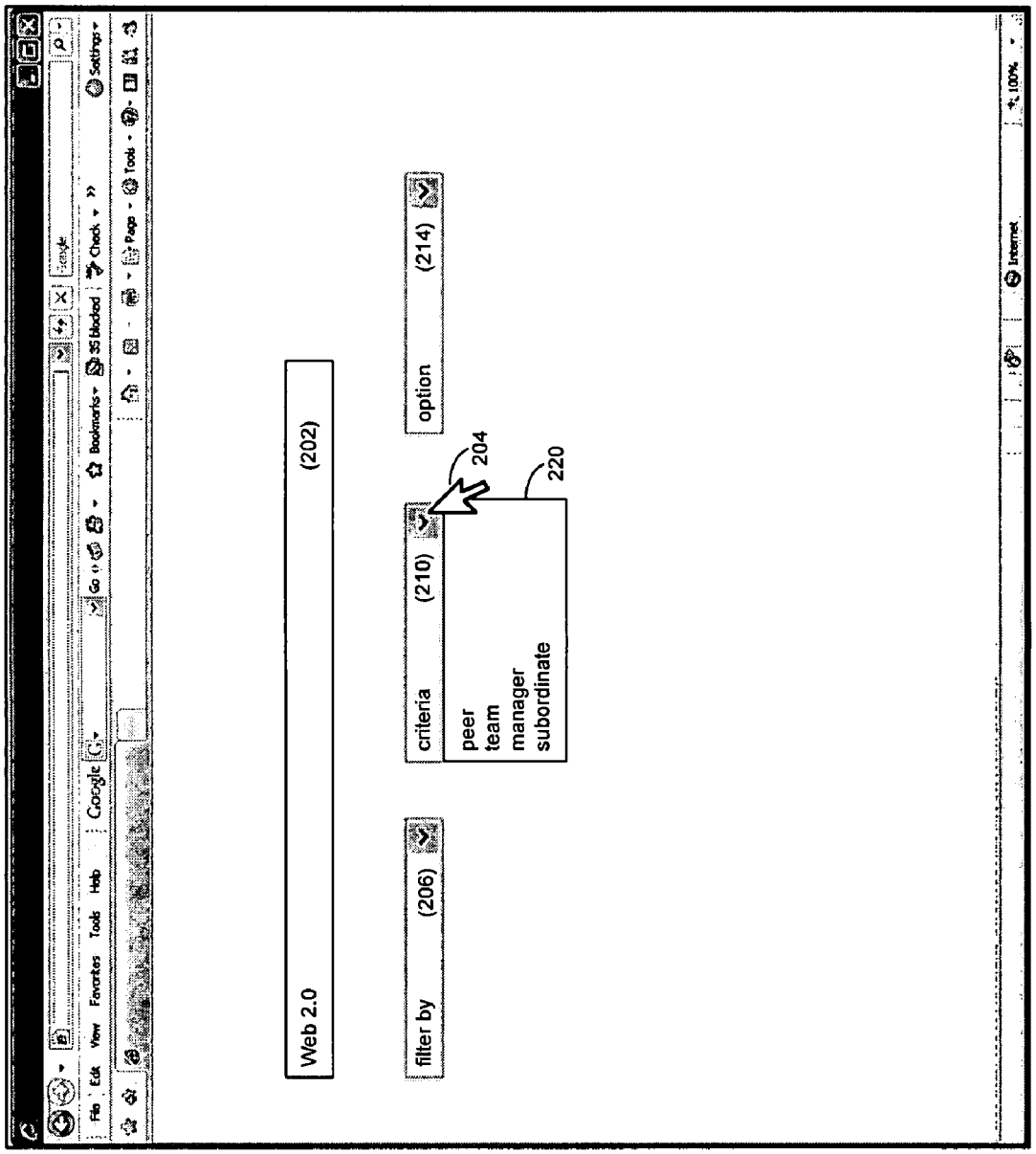
FIG. 8 is a diagrammatic view of a user interface screen provided by the filter process and/or the content application of FIG. 1.

Further, defining 100 one or more filter criteria may include defining one or more filter criteria based upon, at least in part, one or more relationships defined by the organizational structure. For example, filter process 10 may allow user 48 to select, via onscreen pointer, the "relationship" option from filter menu 208 (as shown in FIG. 4), resulting in filter process 10 activating criteria drop down 210. Referring also to FIG. 8, user 48 may select, via onscreen pointer 204, criteria drop down 210, resulting in filter process, content provision application 20, and/or content consumption application 22 rendering relationship menu 220 including relationship options "peer", "team", "manager", and "subordinate". Relationship menu 220 may include various additional/alternative relationships that may be discernable from corporate directory 66.

Figure 9:
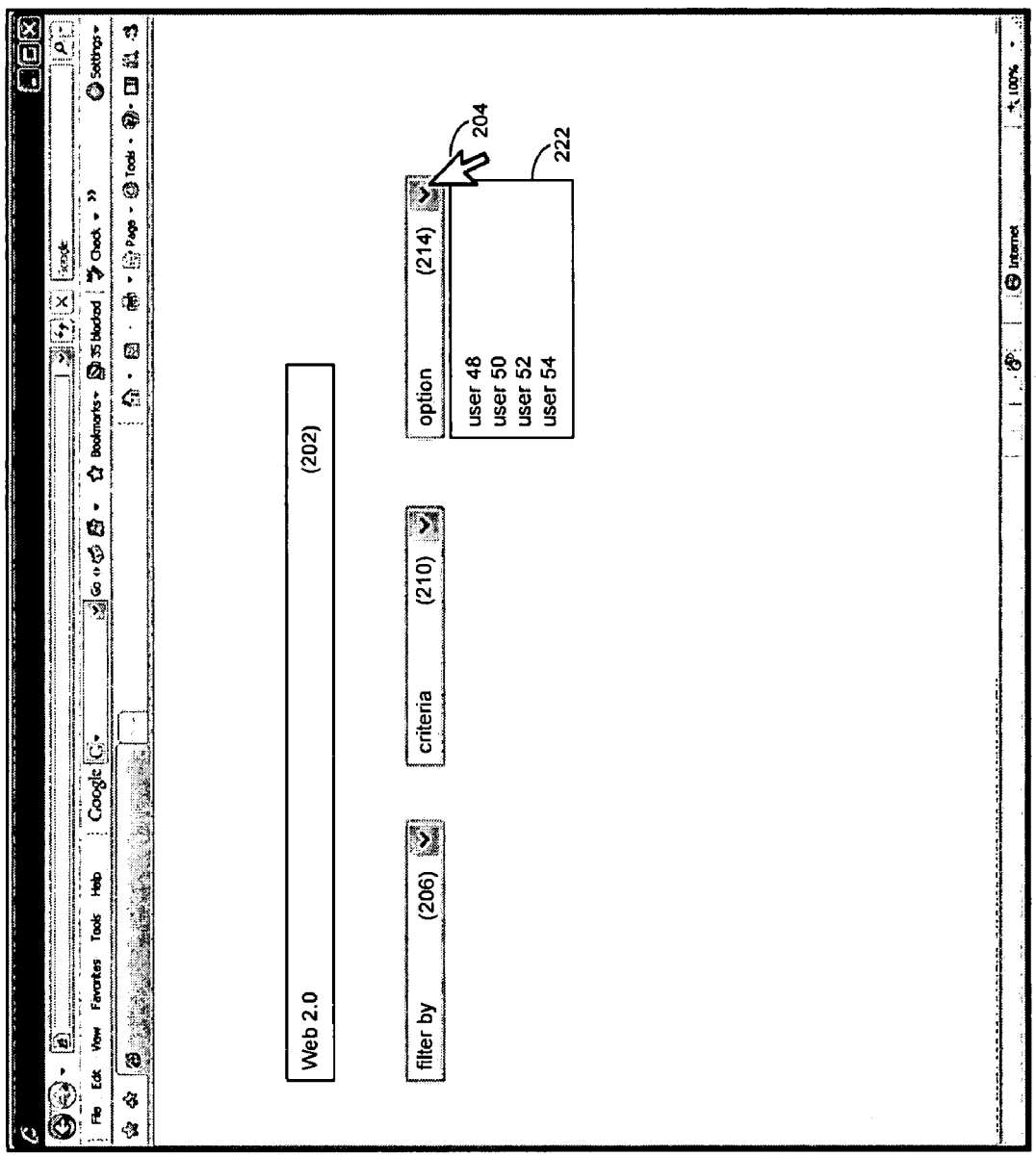
FIG. 9 is a diagrammatic view of a user interface screen provided by the filter process and/or the content application of FIG. 1.

Continuing with the above example, user 48 may be interested in content relating to Web 2.0 that was created or added by individuals in user 52's team. Filter process 10 may allow user 48 to select, via onscreen pointer 204, "team" in relationship menu 220. Referring also to FIG. 9, user 48 may select option drop down 214, resulting in filter process 10, content provision application 20, and/or content consumption application 22 rendering menu 222. Menu 222 may be, for example, a contacts list referencing corporate directory, or the like, including a listing of one or more individuals within the organization. User 48 may select, via onscreen pointer 204, user 52 in menu 222. In the above manner, filter process 10 may allow user 48 to define 100 a filter criteria based upon, at least in part, the relationship user 52's team. Based upon, at least in part, corporate directory 66, individuals in user 52's team (e.g., user 52 and user 54) may be identified for the purpose of filtering content.

As alluded to above, filter process 10 may allow a user to define 100 one or more than one filter criteria. Defining 100 more than one filter criteria may include, for example defining one or more complex and/or compound filter criteria (e.g., tags added by a manager OR by an architect). In this regard, filter process 10 may implement the use of Boolean/logical connectors (e.g., OR, AND, NOR, NOT, Exclusive OR, etc.) for defining 100 the one or more filter criteria. For example, in the context of a filter criteria defined 100 including manager OR architect, filter process 10 may allow a user to define 100 a single filter criteria for a manager OR an architect. Additionally/alternatively, filter process 10 may allow the user to define 100 two filter criteria: 1) for a manager, 2) for an architect. As noted above, various additional and/or alternative logical connectors may be implemented. Additionally, the defined 100 one or more filter criteria may include mixed forms of filter criteria. For example, filter process 10 may allow a user to define a filter criteria e.g., for content tagged by a manager and (e.g., logical AND) a user having a hierarchal position above tier 3. Various additional/alternative implementations may be utilized.

Once one or more filter criteria have been defined 100, filter process 10 may filter 102 the body of content based upon, at least in part, the defined 100 filter criteria. Filtering 102 the body of content based upon, at least in part, the defined 100 filter criteria may include searching the body of content and selecting 106 one or more pieces of content based upon, at least in part, the filter criteria. Continuing with the above-described example in which user 48 defined 100 a filter criteria based upon the positions "managers" and "architects" for tags relating to Web 2.0 in a tag repository, one or more of content provision application 20 and content consumption application 22 may search the tag repository (e.g., content 30) for documents relating to Web 2.0.

Based upon the search of the tag repository (e.g., content 30), one or more search results (pieces of content, for example, web pages, documents, emails, or the like, identified as being related to Web 2.0 based upon one or more tags in the tag repository) may be returned by content provision application 20 and/or content consumption application 22. Filter process 10 may filter 102 the body of content (e.g., tags in the tag repository) based upon the defined 100 filter criteria (e.g., position of "manager" or "architect") by selecting 106 one or more of the tags related to Web 2.0 based upon, at least in part, the filter criteria. That is, filter process 10 may select 106 those tags related to Web 2.0 that were added, edited, etc. by a manager or an architect, based upon users identified in corporate directory 66 as being a manager or an architect. Filter process 10, content provision application 20, and/or content consumption process 22 may provide 104 user 48 with the selected 106 pieces of content (e.g., based upon the selected 106 tags).

In another example, filtering 102 the body of content may include searching 108 the body of content based upon, at least in part, the one or more filter criteria. Still continuing with the example in which user 48 is interested in information that was identified as being related to Web 2.0 by a manager or architect, one or more of filter process 10, content provision application 20, and/or content consumption application 22 may search content 30 for tags related to Web 2.0 added, edited, etc. by managers or architects. That is, the defined 100 filter criteria "managers" or "architects" may be included as search criteria (along with Web 2.0) for searching content 30. Filter process 10 may identify managers and architects (e.g., specific individuals) based upon, at least in part, corporate directory 66. One or more tags related to Web 2.0, which were added, edited, etc., by managers or architects, may be returned based upon the search of content 30. Filter process 10, content provision application, and/or content consumption process 22 may provide 104 user 48 with the pieces of content (i.e., web pages, documents and the like) based upon the search result of the tag repository.

Figure 10:
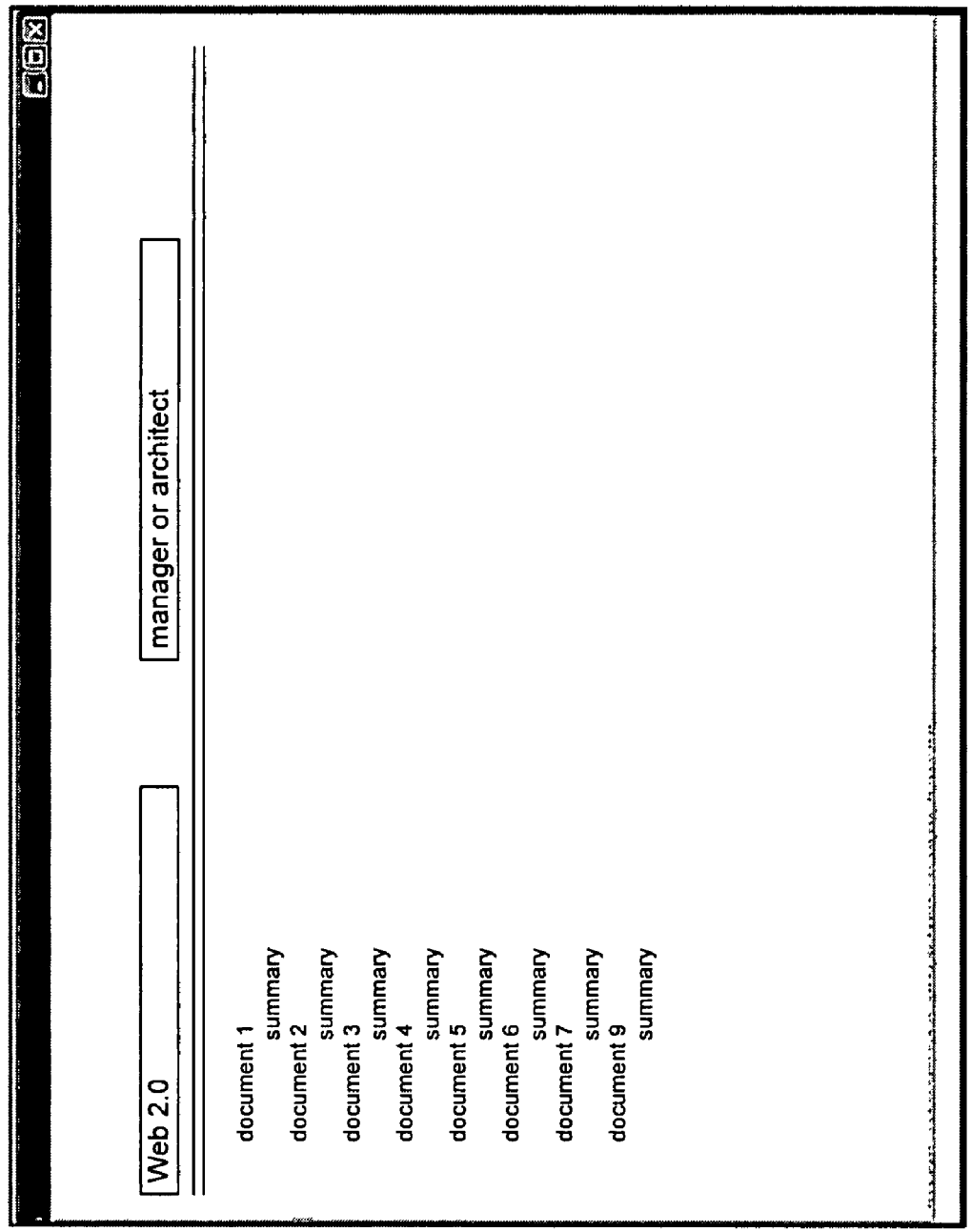
FIG. 10 is a diagrammatic view of a display screen rendered by the content application of FIG. 1.

Filtering 102 the body of content may include searching the body of content and prioritizing 110 one or more results of the search based upon, at least in part, the filter criteria. For example, and referring also to FIG. 10, content consumption application 22 may render display screen 250 including a listing of a plurality of pieces of content (e.g., documents identified by the tags in the body of content) related to Web 2.0, namely "document 1" through "document 9". Filter process 10 may prioritize 110 the search results of content 30 (i.e., may prioritize the search result of the tags) and may similarly prioritize the pieces of content (i.e., "document 1" through "document 9") based upon, at least in part, the defined 100 filter criteria. Continuing with this example, filter process 10 may prioritize the search results including providing 104 the tags added, edited, etc., by a manager or an architect first (e.g., reflected by the pieces of content, "document 1" through "document 5", identified by the tags), and those tags not added, created, edited, etc. by a manager or an architect following (e.g., as reflected by the pieces of content "document 6" through "document 9", identified as related to Web 2.0, but not tagged by managers or architects). As discussed above, content (e.g., tags within the tag repository) may be identified as being added, edited, etc. by a manager or an architect based upon, at least in part, the identity of the adding, creating, editing, etc. user and based upon the position of the adding, creating, editing, etc. user based upon, at least in part, corporate directory 66.

Figure 11:
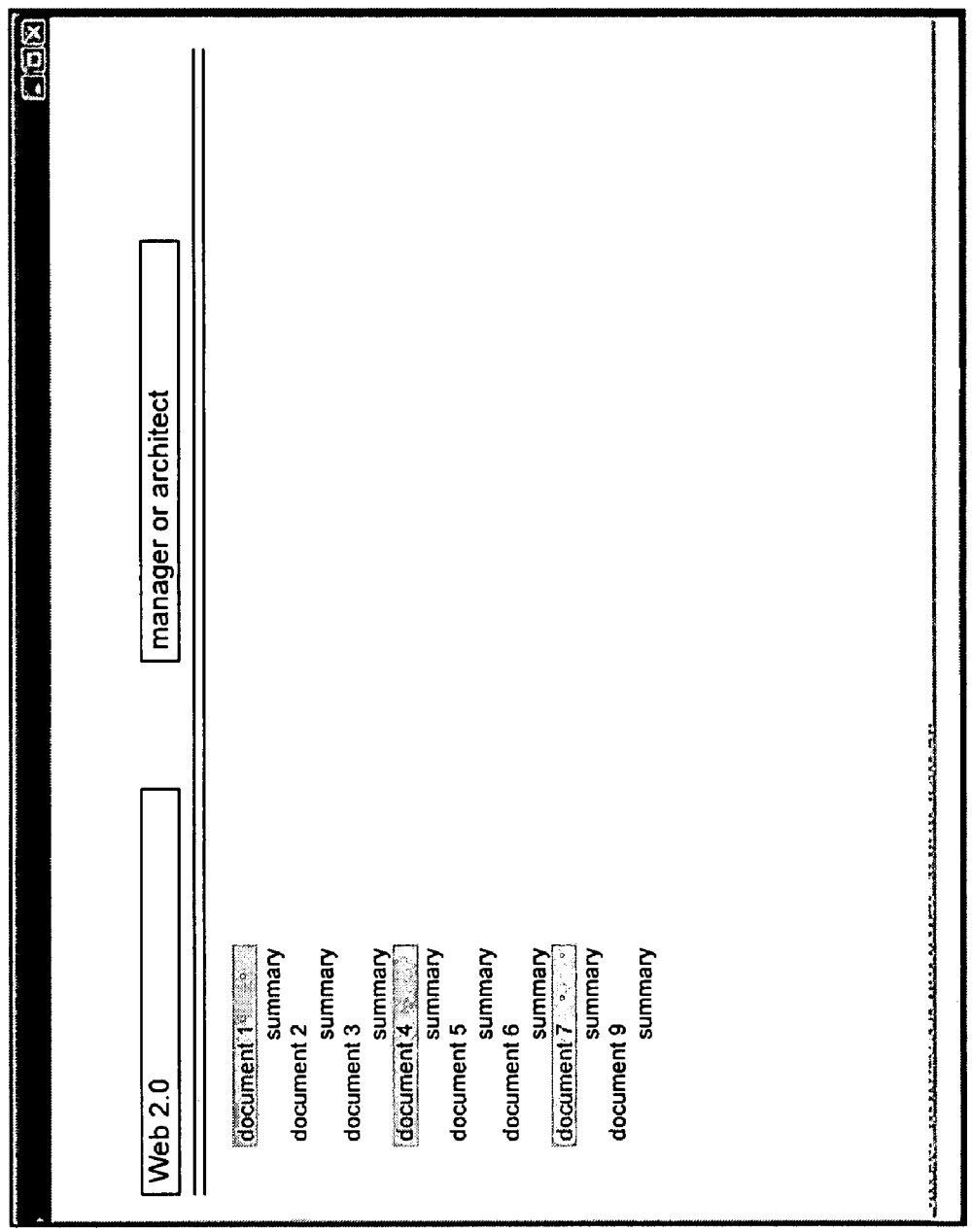
FIG. 11 is a diagrammatic view of a display screen rendered by the content application of FIG. 1.

Additionally/alternatively, filtering 102 the body of content may include associating 112, based upon, at least in part, the one or more filter criteria, one or more indicators with one or more pieces of content. For example, and referring also to FIG. 11, filter process 10 may associate 112 an indicator, in the form of highlighting, with "document 1", "document 4", and "document 7", thereby indicating that "document 1", "document 4", and "document 7" relate to Web 2.0 and were tagged by a manager or an architect (e.g., based upon tags added, edited, etc. by a manager or an architect). Filter process 10 may associate 112 various other indicators (e.g., flags, different fonts, colors, and the like) with one or more pieces of content. Further, filter process 10 may associate 112 different indicators indicative of different aspects of the defined 100 filter criteria. For example, in the present example, different indicators may be associated 112 with documents tagged by managers and tagged by architects. As discussed above, documents (or other content) may be identified as being added, created, edited, etc. by a manager or an architect based upon, at least in part, the identity of the adding, creating, editing, etc. user and based upon the position of the adding, creating, editing, etc. user based upon, at least in part, corporate directory 66.

Filter process 10 may facilitate extracting information from a body of content that is contextually relevant to a given user at a given time. For example, many users searching a tag repository for tags relevant to Web 2.0 may all use the search term Web 2.0. However the content that is received by each of the users may vary based upon, at least in part, the filter criteria applied by the various different users. As such, it may be possible for a user to readily object content that has a relatively high likelihood of being relevant to the user.

A number of implementations have been described. Nevertheless, it will be understood that various modifications may be made. Accordingly, other implementations are within the scope of the following claims.

What is claimed is:

1. A method comprising:
defining, via at least one of a server computer and a client electronic device, one or more filter criteria based upon, at least in part, an organizational structure, a member of an organization associated with the organizational structure, and at least one tag that was at least one of added and edited by the member of the organization associated with the organizational structure, wherein the member of the organization associated with the organizational structure that at least one of added and edited the at least one tag is selected by a user;
filtering, via at least one of the server computer and the client electronic device, a body of content based upon, at least in part, the defined filter criteria, wherein the body of content includes one or more of a document library, a tag repository, a threaded discussion, a wiki, and a blog, and wherein the tag repository includes a plurality of tags, each tag associated with at least one of web content, documents in the document library, and documents in a team space, wherein filtering includes selecting the at least one tag that was at least one of added and edited by the member of the organization associated with the organizational structure, and wherein the member meets the filter criteria based upon, at least in part, the organizational structure and the member that had at least one of added and edited the at least one tag;
providing, via at least one of the server computer and the client electronic device, at least a portion of the filtered body of content, wherein the portion of the filtered body of content is associated with the member of the organization associated with the organizational structure that had at least one of added and edited the at least one tag, and wherein the member meets the filter criteria based upon, at least in part, the organizational structure and the at least one tag that was at least one of added and edited by the member of the organization associated with the organizational structure; and extracting contextually relevant information from the body of content filtered using the defined filter criteria.

2. The method of claim 1, wherein the organizational structure is defined within a corporate directory.

3. The method of claim 2, wherein the corporate directory includes at least one of: a portion of members of a corporation, a hierarchical ranking, a department, and a position.

4. The method of claim 1, wherein defining one or more filter criteria includes defining one or more filter criteria based upon, at least in part, an organizational hierarchy.

5. The method of claim 1, wherein defining one or more filter criteria includes defining one or more filter criteria based upon, at least in part, one or more positions defined within the organizational structure.

6. The method of claim 1, wherein defining one or more filter criteria includes defining one or more filter criteria based upon, at least in part, one or more relationships defined by the organizational structure.

7. The method of claim 1, wherein filtering the body of content based upon, at least in part, the defined filter criteria includes searching the body of content and selecting one or more pieces of content based upon, at least in part, the filter criteria.

8. The method of claim 1, wherein filtering the body of content includes searching the body of content based upon, at least in part, the one or more filter criteria.

9. The method of claim 1, wherein filtering the body of content includes searching the body of content and prioritizing one or more search results based upon, at least in part, the filter criteria.

10. The method of claim 1, wherein filtering the body of content includes associating, based upon, at least in part, the one or more filter criteria, one or more indicators with one or more pieces of content within the body of content.

11. The method of claim 1, wherein the body of content that is filtered is the tag repository.

12. A computer program product residing on a non-transitory computer readable medium having a plurality of instructions stored thereon which, when executed by a processor, cause the processor to perform operations comprising:

defining one or more filter criteria based upon, at least in part, an organizational structure, a member of an organization associated with the organizational structure, and at least one tag that was at least one of added and edited by the member of the organization associated with the organizational structure, wherein the member of the organization associated with the organizational structure that at least one of added and edited the at least one tag is selected by a user;

filtering a body of content based upon, at least in part, the defined filter criteria, wherein the body of content includes one or more of a document library, a tag repository, a threaded discussion, a wiki, and a blog, and wherein the tag repository includes a plurality of tags, each tag associated with at least one of web content, documents in the document library, and documents in a team space, wherein filtering includes selecting the at least one tag that was at least one of added and edited by the member of the organization associated with the organizational structure, and wherein the member meets the filter criteria based upon, at least in part, the organizational structure and the member that had at least one of added and edited the at least one tag;

providing at least a portion of the filtered body of content, wherein the portion of the filtered body of content is associated with the member of the organization associated with the organizational structure that had at least one of added and edited the at least one tag, and wherein the member meets the filter criteria based upon, at least in part, the organizational structure and the at least one tag that was at least one of added and edited by the member of the organization associated with the organizational structure; and extracting contextually relevant information from the body of content filtered using the defined filter criteria.

13. The computer program product of claim 12, wherein the organizational structure is defined within a corporate directory.

14. The computer program product of claim 12, wherein the instructions for defining one or more filter criteria include instructions for defining one or more filter criteria based upon, at least in part, an organizational hierarchy.

15. The computer program product of claim 12, wherein the instructions for defining one or more filter criteria include instructions for defining one or more filter criteria based upon, at least in part, one or more positions defined within the organizational structure.

16. The computer program product of claim 12, wherein the instructions for defining one or more filter criteria include instructions for defining one or more filter criteria based upon, at least in part, one or more relationships defined by the organizational structure.

17. The computer program product of claim 12, wherein the instructions for filtering the body of content based upon, at least in part, the defined filter criteria include instructions for searching the body of content and selecting one or more pieces of content based upon, at least in part, the filter criteria.

18. The computer program product of claim 12, wherein the instructions for filtering the body of content include instructions for searching the body of content based upon, at least in part, the one or more filter criteria.

19. The computer program product of claim 12, wherein the instructions for filtering the body of content include instructions for searching the body of content and prioritizing one or more search results based upon, at least in part, the filter criteria.

20. The computer program product of claim 12, wherein the instructions for filtering the body of content include instructions for associating, based upon, at least in part, the one or more filter criteria, one or more indicators with one or more pieces of content within the body of content.

* * * * *

UNITED STATES PATENT AND TRADEMARK OFFICE
CERTIFICATE OF CORRECTION

PATENT NO. : 8,370,368 B2  
APPLICATION NO. : 11/940624  
DATED : February 5, 2013  
INVENTOR(S) : Patrick Joseph O'Sullivan et al.

Page 1 of 1

It is certified that error appears in the above-identified patent and that said Letters Patent is hereby corrected as shown below:

Title page, item (75) inventor: should read as follows:

STERN; Edith Helen    Yorktown Heights    NY    US

Signed and Sealed this
Second Day of April, 2013

Teresa Stanek Rea
*Acting Director of the United States Patent and Trademark Office*